(12) United States Patent
Zlotnick

(10) Patent No.: US 6,778,703 B1
(45) Date of Patent: Aug. 17, 2004

(54) FORM RECOGNITION USING REFERENCE AREAS

(75) Inventor: Aviad Zlotnick, Mizpe Netofa (IL)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/553,122

(22) Filed: Apr. 19, 2000

(51) Int. Cl.$^7$ .............................................. G06K 9/68
(52) U.S. Cl. ...................................................... 382/218
(58) Field of Search ................................ 382/209, 217, 382/218, 219, 220

(56) References Cited

U.S. PATENT DOCUMENTS

| | | | |
|---|---|---|---|
| 4,832,477 A | 5/1989 | Torii et al. | |
| 5,067,162 A | 11/1991 | Driscoll, Jr. et al. | |
| 5,182,656 A | 1/1993 | Chevion et al. | |
| 5,191,525 A | 3/1993 | LeBrun et al. | |
| 5,204,756 A | 4/1993 | Chevion et al. | |
| 5,365,251 A | * 11/1994 | Denber ........................ | 345/611 |
| 5,715,325 A | 2/1998 | Bang et al. | |
| 5,793,887 A | 8/1998 | Zlotnick | |
| 6,539,112 B1 | * 3/2003 | Smith .......................... | 382/181 |

OTHER PUBLICATIONS

Pizano et al. "A Business Form Recognition System." Proc. 15th Annual Int. Computer Software and Applications Conference, Sep. 11, 1991, pp. 626–632.*

Liu et al. "Description and Recognition of Form and Automated Form Data Entry." Proc. 3rd Int. Conf. on Document Analysis and Recognition, vol. 2, Aug. 14, 1995, pp. 579–582.*

Mao et al. "A Model–Based Form Processing Sub–System." Proc. 13th Int. Conf. on Pattern Recognition, Aug. 25, 1996, vol. 3, pp. 691–695.*

Y.Q. Shi and X. Xia, Circuits and Systems for Video Technology, vol. 7(2), Apr. 1997, "A Thresholding Multi-resolution Block Matching Algorithm", pp. 437–440.

* cited by examiner

Primary Examiner—Jon Chang
(74) Attorney, Agent, or Firm—Darby & Darby

(57) ABSTRACT

A method for processing an input image includes automatically selecting reference areas on each of a plurality of different templates. Reference areas on the input image are compared to the selected reference areas on at least some of the templates, so as to identify the template that most closely matches the input image, and information is extracted from the input image based on the identified template. Typically, the input image is an image of a form document, having fields defined by one of the templates, which fields are filled in with the information. The input image is registered with the identified template in order to extract the information from the fields.

12 Claims, 8 Drawing Sheets

FIG. 2

NAME:
PROFESSION:

STATE OF
ISRAEL

DETAILS:

INSTRUCTIONS:
FILL IN THIS FORM USING BALL
POINT PEN AND..........................

MINISTRY
FORM 999

FORM RECOGNITION USING REFERENCE AREAS

FIELD OF THE INVENTION

The present invention relates generally to document image processing, and specifically to methods for extraction of information that is filled into preprinted forms.

BACKGROUND OF THE INVENTION

In many document imaging systems, large numbers of forms are scanned into a computer, which then processes the resultant document images to extract pertinent information. Typically the forms comprise preprinted templates, containing predefined fields that have been filled in by hand or with machine-printed characters. In some applications, such as population censuses and tax processing systems, a wide variety of different forms are used, and may typically be input to the computer in any order. Before extracting the information that has been filled into any given form, the computer must first recognize which form it has received. Only then can the computer align the form with the proper template, in order to identify the fields of the template and decipher the characters in the fields.

There are a number of methods of form recognition known in the art. Fiducial marks and machine-readable identifying information, such as a bar code, may be printed on the form itself. This approach uses up valuable form "real estate," however, and makes for an inflexible system, capable of processing only forms that have been designed in advance with the appropriate marks. Therefore, a preferred approach is to identify features in the scanned form image. For example, horizontal and vertical lines and text base lines (imaginary lines running through the bottom of the characters in a row), as well as the black background of the scanned paper, may be identified and located. Still, none of these features is guaranteed to exist in all forms of interest, and the text baseline features are generally expensive to compute. Because of the large number of different forms that must be processed in applications such as those mentioned above, there is a need for a form recognition method that is both accurate and fast.

U.S. Pat. No. 5,191,525, whose disclosure is incorporated herein by reference, describes a system and method for extraction of data from form documents for subsequent processing. In order to identify forms passing through the system, a number of identification areas are chosen in advance by a designer from existing printed forms, using an interactive computer display. The designer pre-selects a word or an area already present on the form. The coordinates of the identification area are stored in the computer and are accessed in order to "carve" the appropriate areas from the documents as they are processed. The spelling of the selected word or an electronic signature of the pixel pattern in the area are used to match the features of the processed document to the form. The electronic signature may include a histogram or intersection count. Once the form is identified, the relative location of the selected word or the electronic signature is used to adjust for misregistration and skew that may have arisen in printing or scanning the form.

Another method known in the art for matching pairs of images, such as the form and template images, uses multi-resolution pyramids. This method is most commonly used in motion estimation. Reduced, low-resolution versions of the images are first matched, and the displacement of one image relative to the other is estimated. The matching and displacement estimation are repeated and refined at a succession of higher resolutions (hence the name "pyramid"), until the exact, full-resolution result is found. This type of matching is problematic in relation to form images, however, since it is liable to be confused by information filled into the form.

SUMMARY OF THE INVENTION

It is an object of the present invention to provide improved methods and apparatus for processing of images of form documents.

It is a further object of some aspects of the present invention to provide improved methods for automatically identifying which of a plurality of different form templates corresponds to a given form document.

It is yet a further object of some aspects of the present invention to provide methods for automatically selecting reference areas in form templates and for automatically matching areas of a form document to the reference areas.

In preferred embodiments of the present invention, a document processing system receives images of filled-in form documents to process. The documents are based on a plurality of different form templates whose order of input to the system is not known in advance. In order to determine on which template each document is based, reference areas are chosen on each template. Preferably, one reference area is chosen in each of a number of predefined sectors of the template, typically one reference area per quadrant. Most preferably, the reference areas are chosen automatically, based on a reference metric that embodies criteria designed to ensure that the features of the reference areas are clearly distinguishable from their immediate surroundings and that they are not in parts of the form that are going to be filled in. Thus, there is no need for fiducial marks on the forms or for other constraints on form design. There is also generally no need for a human operator to select the reference areas, as required by the method of the above-mentioned U.S. Pat. No. 5,191,525.

For each template that is a candidate to match the current document, reference areas on the document image are located and registered with the corresponding reference areas of the template. The reference areas on the template and the document are then compared to find a matching score. Generally, the template having the best overall matching score is recognized as the one belonging to this document. The correct template is thus chosen rapidly and, in most cases, completely automatically, even in the absence of lines on the form or other specific features that are commonly used for template recognition and registration. The entire document image is adjusted for fine registration with the chosen template, and the information filled into the document is extracted from the fields of the form, using any suitable method known in the art.

In some preferred embodiments of the present invention, prior to matching the reference areas, a reduced-scale image of the form document is compared to reduced-scale images of the templates. These reduced-scale images are referred to herein as icons. Matching of the icons is used to make a preliminary assessment of which templates are the best candidates to match the whole document. To generate such an icon, the full-scale image is binarized (if it is not already in binary form) and is divided into a matrix of blocks. A gray-scale icon is produced having one pixel for each block in the full-scale image. The gray-scale value of each pixel in the icon is equal to the sum of the binary values of the pixels in the corresponding block. Preferably, the gray-scale icon is then binarized, using any suitable binarization algorithm known in the art.

It has been found that icons produced in this manner represent the full-scale source images more faithfully than do icons generated by purely binary scaling algorithms, as are known in the art. Furthermore, the use of icon matching as a preliminary step to matching the reference areas saves processing time, by narrowing the field of candidate templates. On the other hand, combining one icon matching stage with the subsequent reference area matching stage is considerably faster and less computation-intensive than full, multi-resolution pyramid-based fitting algorithms, as are known in the art.

In some preferred embodiments of the present invention, the reference areas are used to register the form document with the candidate template or templates in a number of successive stages. In a first, coarse stage, a tentative identification is made of the reference areas in the document image that most closely correspond to the defined reference areas in the candidate template. Preferably, the tentative identification is made by histogram matching, or by another computationally-efficient technique known in the art. The identified reference areas on the form document are then registered with the corresponding areas of the template, typically by rotation, scaling and/or warping of the areas. Preferably, the image warping is carried out using methods such as those described in U.S. Pat. No. 5,793,887, which is incorporated herein by reference, although other methods known in the art may also be used.

At this point, the matching scores are computed and, typically, the template with the best matching score is chosen. A final transformation to be applied to the entire document image is preferably determined by finding a cluster of the transformations necessary to carry each of the document reference areas into the corresponding reference area of the template. These transformations typically include rotation, scaling and offset. The term "cluster" as used in the present patent applications and in the claims refers to a group of transformations of a given type whose magnitudes are within predefined bounds of one another. The final transformation that is applied is a composite of the cluster, preferably a weighted mean of the transformations in the cluster. Using clusters in this manner avoids the possibility of distortions due to the effect of outlying points, i.e., reference areas that have been incorrectly or inaccurately identified. It is also possible to use clusters of one or two of the transformation types (rotation, scaling offset) while taking a non-clustered mean or median of the other transformations.

There is therefore provided, in accordance with a preferred embodiment of the present invention, a method for processing an input image, including:

for each of a plurality of different templates, computing a reference metric for each of a multiplicity of candidate areas;

selecting reference areas from among the candidate areas on each of the plurality of different templates responsive to the reference metrics thereof;

comparing reference areas on the input image to the selected reference areas on at least some of the templates, so as to compute a matching score for each of the templates indicating a degree of similarity between the template and the input image;

identifying the template whose matching score indicates the greatest degree of similarity; and extracting information from the input image based on the identified template.

Preferably, the input image includes an image of a form document, having fields defined by one of the templates, which fields are filled in with the information, and extracting the information includes registering the input image with the identified template. Preferably, computing the reference metric for each of the candidate areas includes estimating a likelihood that the candidate area will be filled in. Most preferably, selecting the areas includes rejecting areas that include runs of white pixels of a length exceeding a predetermined criterion.

Additionally or alternatively, computing the reference metric for each of the candidate areas includes estimating a likelihood of a change in appearance of the area due to contrast variations in scanning an object that appears in the input image. Preferably, selecting the areas includes rejecting areas that include predetermined concentrations of black pixels.

Preferably, computing the reference metric includes determining a risk score indicative of a likelihood of confusion in identifying the template based on a given reference area, and selecting the reference areas includes selecting one or more reference areas having respective risk scores within a predetermined limit. Most preferably, selecting the reference areas includes selecting at least one of the candidate areas in each of a number of predetermined sectors of the template.

There is also provided, in accordance with a preferred embodiment of the present invention, a method for processing an input image with reference to a plurality of image templates, the method including:

generating an input icon representing the input image at a reduced scale;

comparing the input icon to a plurality of template icons, each such template icon representing a respective one of the templates at the reduced scale, so as to compute an icon matching score for each of the templates indicating a degree of similarity between the template icon and the input image icon;

selecting one or more of the templates whose respective icon matching scores indicate a degree of similarity greater than that of the other templates;

comparing reference areas on the input image to chosen reference areas on the one or more selected templates, so as to compute a template matching score for each of the templates indicating a degree of similarity between the template and the input image;

identifying the template whose template matching score indicates the greatest degree of similarity; and extracting information from the input image based on the identified template.

Preferably, comparing the icons includes finding respective initial transformations based on aligning the input icon with the icons of the selected templates, and comparing the reference areas includes applying the respective initial transformations to locate the reference areas in the input image. Further preferably, comparing the reference areas includes applying one or more additional transformations to align the input image with the identified template, responsive to a discrepancy found between the positions of the reference areas on the input image and on the identified template. Most preferably, applying the one or more additional transformations includes determining respective transformations to be applied to the reference areas on the input image in order to register the reference areas on the input image with corresponding reference areas on the identified template, and applying a weighted composite of the determined transformations to the entire input image, so as to bring the input image into alignment with the template.

Preferably, comparing the reference areas includes computing an area matching score indicative of a degree of similarity between each of the reference areas on the input image and a corresponding one of the chosen reference areas on each of the selected templates, and computing the template matching score based on the area matching scores.

There is additionally provided, in accordance with a preferred embodiment of the present invention, a method for reducing the scale of a binary image, in which each binary pixel has a value of zero or one, including:

dividing the binary image into a matrix of blocks of a predetermined size; and generating a gray-scale image including a plurality of gray-scale pixels, each corresponding to one of the blocks in the matrix and having a gray-scale pixel value equal to the summed value of the binary pixels in the block.

Preferably, the method includes binarizing the gray-scale image to generate a reduced-scale binary image.

There is further provided, in accordance with a preferred embodiment of the present invention, a method for processing an input image, including:

determining respective reference area transformations to be applied to a plurality of reference areas on the input image in order to register the reference areas on the input image with corresponding reference areas on a template;

deriving from selected subsets of the reference area transformations candidate global transformations of one or more types to be applied to the input image;

finding a cluster of the candidate global transformations of a given one of the types having respective magnitudes within predetermined limits of one another;

applying a composite result of the candidate global transformations in the cluster to the entire input image, so as to bring the input image into registration with the template; and extracting information from the input image based on the template with which the image is registered.

Preferably, the types of the transformations are selected from a group of transformations consisting of skew, scale and offset transformations. Further preferably, applying the composite result includes computing a weighted mean of the magnitudes of the transformations in the cluster, and applying the given type of transformation to the entire input image with a transformation magnitude given by the weighted mean.

There is moreover provided, in accordance with a preferred embodiment of the present invention, apparatus for processing an input image, including:

a memory, which is adapted to store images of a plurality of different templates; and an image processor, which is adapted to compute a reference metric for each of a multiplicity of candidate areas on each of the templates and to select reference areas from among the candidate areas on each of the plurality of different templates responsive to the reference metrics thereof, and further to receive the input image and compare reference areas on the input image to the selected reference areas on at least some of the templates, so as to compute a matching score for each of the templates indicating a degree of similarity between the template and the input image and to identify the template whose matching score indicates the greatest degree of similarity, and extract information from the input image based on the identified template.

Preferably, the input image includes an image of a form document, having fields defined by one of the templates, which fields are filled in with the information, and the processor is adapted to register the input image with the identified template. In a preferred embodiment, the apparatus includes an image input device, which is adapted to capture the image of the form document and to convey the image to the processor.

There is furthermore provided, in accordance with a preferred embodiment of the present invention, apparatus for processing an input image, including:

a memory, which is adapted to store image data with respect to a plurality of different templates, including template icons, each such template icon representing a respective one of the templates at the reduced scale, and reference areas chosen on each of the templates; and an image processor, adapted to receive the input image and to generate an input icon representing the input image at a reduced scale, to compare the input icon to the template icons so as to compute an icon matching score for each of the templates indicating a degree of similarity between the template icon and the input image icon and to select one or more of the templates whose respective icon matching scores indicate a degree of similarity greater than that of the other templates, and further to compare reference areas on the input image to the chosen reference areas on the one or more selected templates, so as to compute a template matching score for each of the templates indicating a degree of similarity between the template and the input image, and to identify the template whose template matching score indicates the greatest degree of similarity, so as to extract information from the input image based on the identified template.

There is additionally provided, in accordance with a preferred embodiment of the present invention, apparatus for reducing the scale of a binary image, in which each binary pixel has a value of zero or one, including an image processor, which is adapted to divide the binary image into a matrix of blocks of a predetermined size, and to generate a gray-scale image including a plurality of gray-scale pixels, each corresponding to one of the blocks in the matrix and having a gray-scale pixel value equal to the summed value of the binary pixels in the block.

There is also provided, in accordance with a preferred embodiment of the present invention, apparatus for processing an input image, including:

a memory, which is adapted to store image data with respect to a plurality of different templates, including reference areas chosen on the templates; and an image processor, adapted to receive the input image and to determine respective reference area transformations to be applied to a plurality of reference areas on the input image in order to register the reference areas on the input image with corresponding reference areas on a template, and to derive from selected subsets of the reference area transformations candidate global transformations of one or more types to be applied to the input image, to find a cluster of the candidate global transformations of a given one of the types having respective magnitudes within predetermined limits of one another, and to apply a composite result of the candidate global transformations in the cluster to the entire input image, so as to bring the input image into registration with the template, thus to extract information from the input image based on the template with which the image is registered.

There is further provided, in accordance with a preferred embodiment of the present invention, a computer software product for processing an input image, including a computer-readable medium having program instructions stored therein, which instructions, when read by a computer, cause the computer to compute a reference metric for each of a multiplicity of candidate areas reference areas on each of a plurality of different templates and to select reference areas from among the candidate areas on each of the plurality of different templates responsive to the reference metrics thereof, and further to compare reference areas on the input image to the selected reference areas on at least some of the templates, so as to compute a matching score for each of the templates indicating a degree of similarity between the template and the input image and to identify the template whose matching score indicates the greatest degree of similarity, and to extract information from the input image based on the identified template.

There is moreover provided, in accordance with a preferred embodiment of the present invention, a computer software product for processing an input image, including a computer-readable medium having program instructions stored therein, which instructions, when read by a computer, cause the computer to generate an input icon representing the input image at a reduced scale, to compare the input icon to a plurality of template icons, each such template icon representing a respective one of the templates at the reduced scale, so as to compute an icon matching score for each of the templates indicating a degree of similarity between the template icon and the input image icon and to select one or more of the templates whose respective icon matching scores indicate a degree of similarity greater than that of the other templates, to further to compare reference areas on the input image to chosen reference areas on the one or more selected templates, so as to compute a template matching score for each of the templates indicating a degree of similarity between the template and the input image, and to identify the template whose template matching score indicates the greatest degree of similarity, and to extract information from the input image based on the identified template.

There is still further provided, in accordance with a preferred embodiment of the present invention, a computer software product for processing an input image, including a computer-readable medium having program instructions stored therein, which instructions, when read by a computer, cause the computer to divide the binary image into a matrix of blocks of a predetermined size, and to generate a gray-scale image including a plurality of gray-scale pixels, each corresponding to one of the blocks in the matrix and having a gray-scale pixel value equal to the summed value of the binary pixels in the block, whereby a reduced-scale binary image is generated by binarizing the gray-scale image.

There is also provided, in accordance with a preferred embodiment of the present invention, a computer software product for processing an input image, including a computer-readable medium having program instructions stored therein, which instructions, when read by a computer, cause the computer to determine respective reference area transformations to be applied to a plurality of reference areas on the input image in order to register the reference areas on the input image with corresponding reference areas on a template, and to derive from selected subsets of the reference area transformations candidate global transformations of one or more types to be applied to the input image, to find a cluster of the candidate global transformations of a given one of the types having respective magnitudes within predetermined limits of one another, and to apply a composite result of the candidate global transformations in the cluster to the entire input image, so as to bring the input image into registration with the template, and to extract information from the input image based on the template with which the image is registered.

The present invention will be more fully understood from the following detailed description of the preferred embodiments thereof, taken together with the drawings in which:

BRIEF DESCRIPTION OF THE DRAWINGS

FIG. 2 is a schematic representation of a form template, illustrating reference areas chosen for use in matching a document image to the template, in accordance with a preferred embodiment of the present invention;

DETAILED DESCRIPTION OF PREFERRED EMBODIMENTS

Figure 1:
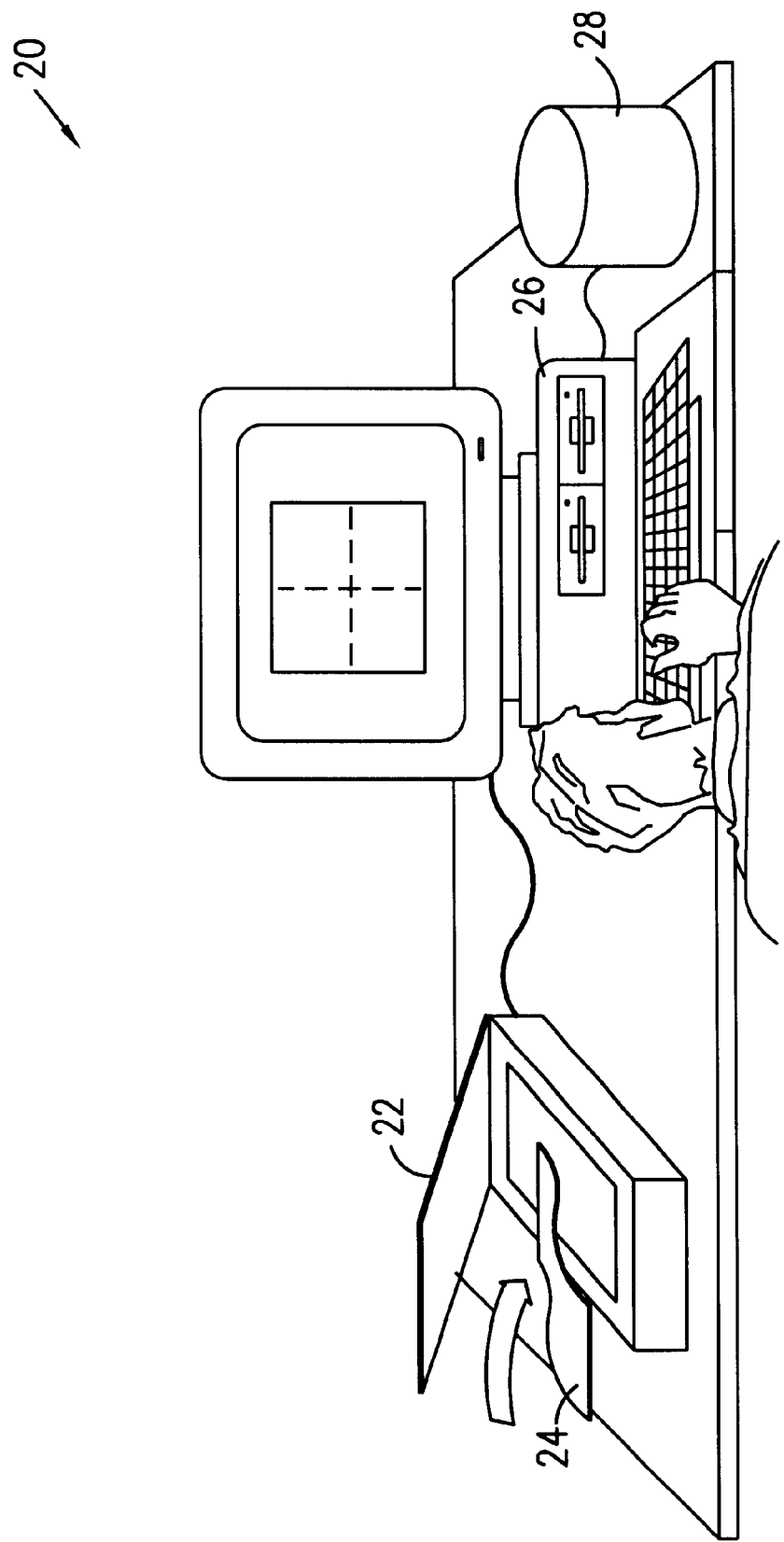
FIG. 1 is a schematic, pictorial illustration of apparatus for document image processing, in accordance with a preferred embodiment of the present invention.

FIG. 1 is a schematic, pictorial illustration of a system 20 for processing of document images, in accordance with a preferred embodiment of the present invention. System 20 comprises a scanner 22, or any other suitable type of image capture device known in the art. The scanner receives and scans a document comprising a preprinted form, such as document 24, which is filled in with handwritten, typed or printed characters. The scanner captures an image of the document and conveys the corresponding image data to a form processor 26, typically comprising a suitable general-purpose computer. Alternatively, the image is input to the processor from another source. Processor 26 compares the document image with reference template images that are stored in a memory 28, such as a magnetic or optical disk. The processor chooses the template that best matches the document from among a collection of such templates stored in memory 28, as described hereinbelow. Optionally, the processor then extracts information from the fields of the template, as they appear on document 24, using methods known in the art.

The image processing functions of processor 26 are preferably performed using software running on the processor, which implements an embodiment of the present invention, as described in detail hereinbelow. The software may be supplied on tangible media, such as diskettes or CD-ROM, and loaded into the processor. Alternatively, the software may be downloaded to the processor via a network connection or other electronic link. Further alternatively, processor 26 may comprises dedicated, hard-wired elements or a digital signal processor for carrying out some or all of the image processing steps.

FIG. 2 is a schematic representation of a typical form template 25, illustrating reference areas 44, 46, 48, 50 chosen for matching an image of document 24, in accordance with a preferred embodiment of the present invention. These reference areas are also referred to herein as reference boxes. As described hereinbelow, the reference areas are used for matching document 24 and other documents to template 25. Reference areas are likewise located on other templates stored in memory 28 and are used by processor 26 to recognize the template corresponding to each document processed by apparatus 20.

Reference areas 44, 46, 48 and 50 are chosen because they contain sufficient detail and are not likely to be overwritten by characters filled into the corresponding form. It is also important that the features in the reference areas be clearly defined, without too many black pixels, so that the features in the area do not fuse into a black mass when contrast is increased or fade away when the contrast is reduced. Thus, reference areas 44 and 48 contain mainly large printed characters 40, while areas 46 and 50 also contain graphic elements, such as a symbol 42. On the other hand, lines 38 or boxes, having wide enough spaces so that characters can be filled into them when form document 24 is completed, are generally excluded from the reference areas.

Preferably, template 25 is divided into quadrants 30, 32, 34 and 36, and a respective reference area is found in each of the quadrants. A method for choosing optimal reference areas is described hereinbelow with reference to FIGS. 5A and 5B. The template may alternatively be divided into a number of sectors greater or less than four. Some or all of the sectors may have more than a single reference area. Most preferably, each reference area comprises a box 100×100 pixels in size. Alternatively, smaller boxes may be used, such as 50×50 pixels, if no acceptable larger box is found. On the other hand, if no reference area meeting minimal criteria of acceptability is found in one of the sectors, then there is no reference area chosen in that sector.

Figure 3:
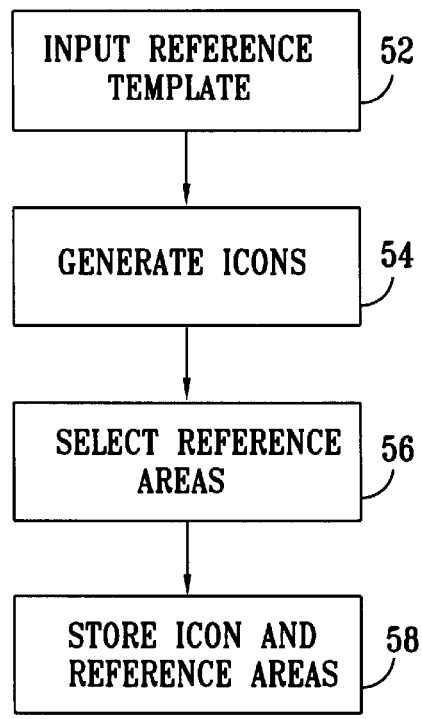
FIG. 3 is a flow chart that schematically illustrates a method of processing a form template so as to generate data for use in matching a document image to the template, in accordance with a preferred embodiment of the present invention.

FIG. 3 is a flow chart that schematically illustrates a method for preparing template 25 and other, similar templates for matching to form documents, in accordance with a preferred embodiment of the present invention. At an input step 52, template 25 is received for processing. At an icon generation step 54, one or more scaled-down versions of the template are produced, as described in detail hereinbelow. Such scaled-down images are referred to herein as icons. Preferably, the icons are scaled down by 1:16 and/or 1:32 in each dimension. The icons are used, as described hereinbelow, in making a preliminary match between document 24 and one or, more typically, a plurality of templates that may match the document. At a reference area selection step 56, reference areas 44, 46, 48 and 50 of template 25 are selected. Finally, for each template, the icon or icons and the selected reference areas are stored in memory 28, at a storage step 58, for subsequent reference in processing document 24.

Figure 4:
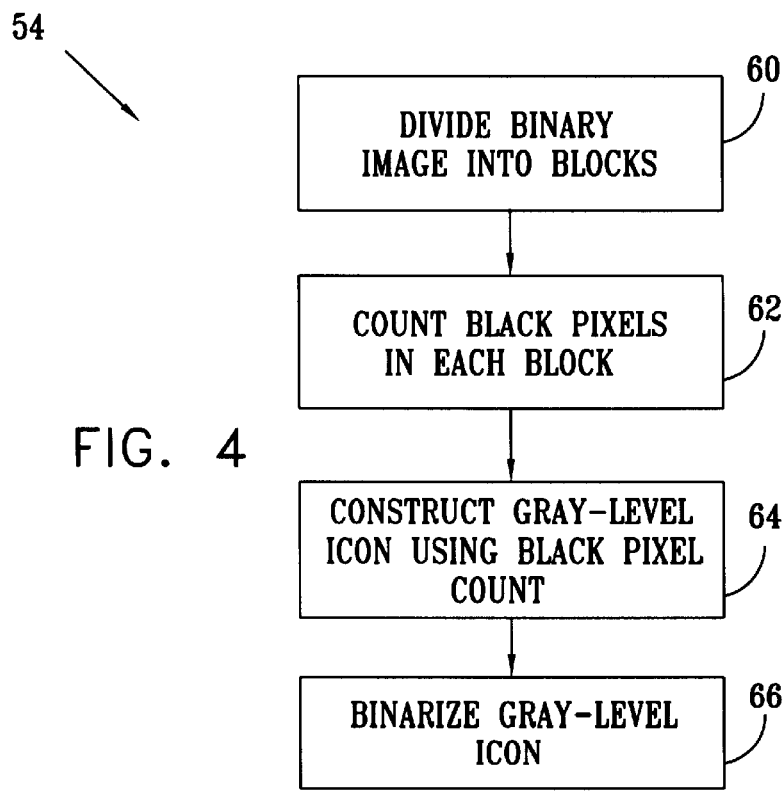
FIG. 4 is a flow chart that schematically illustrates a method for generating a reduced-scale icon of a given binary image, in accordance with a preferred embodiment of the present invention.

FIG. 4 is a flow chart that schematically illustrates details of icon generation step 54, in accordance with a preferred embodiment of the present invention. Although the method of FIG. 4 is described with reference to template images, a similar method is preferably also used to generate an icon of document 24 for comparison with the template icons. The method begins at a block division step 60, at which a binary image of template 25 is divided into a matrix of blocks. Typically, each block comprises 16×16 or 32×32 pixels, although it will be understood that other block sizes may also be used. Generally, the template image is already in binary form, but if a gray-scale image is used, it is preferably binarized before further processing.

At a pixel count step 62, the number of black pixels in each block is counted. Equivalently, the values of all of the pixels in the block (zero or one, or numerical values if the image is not binarized at step 60) are summed. At an icon construction step 64, a reduced-scale gray-level image is constructed, in which each of the blocks defined at step 60 is represented by a single pixel. The gray level of each pixel is given by the sum of the pixel values in the corresponding block. Preferably, at a binarization step 66, the gray-level values of the icon are binarized, using any suitable binarization algorithm known in the art. In this manner, a binary icon of template 25 is formed and is stored for later reference. Alternatively or additionally, the gray-level icon from step 64 is stored and used for later reference.

Figure 5A:
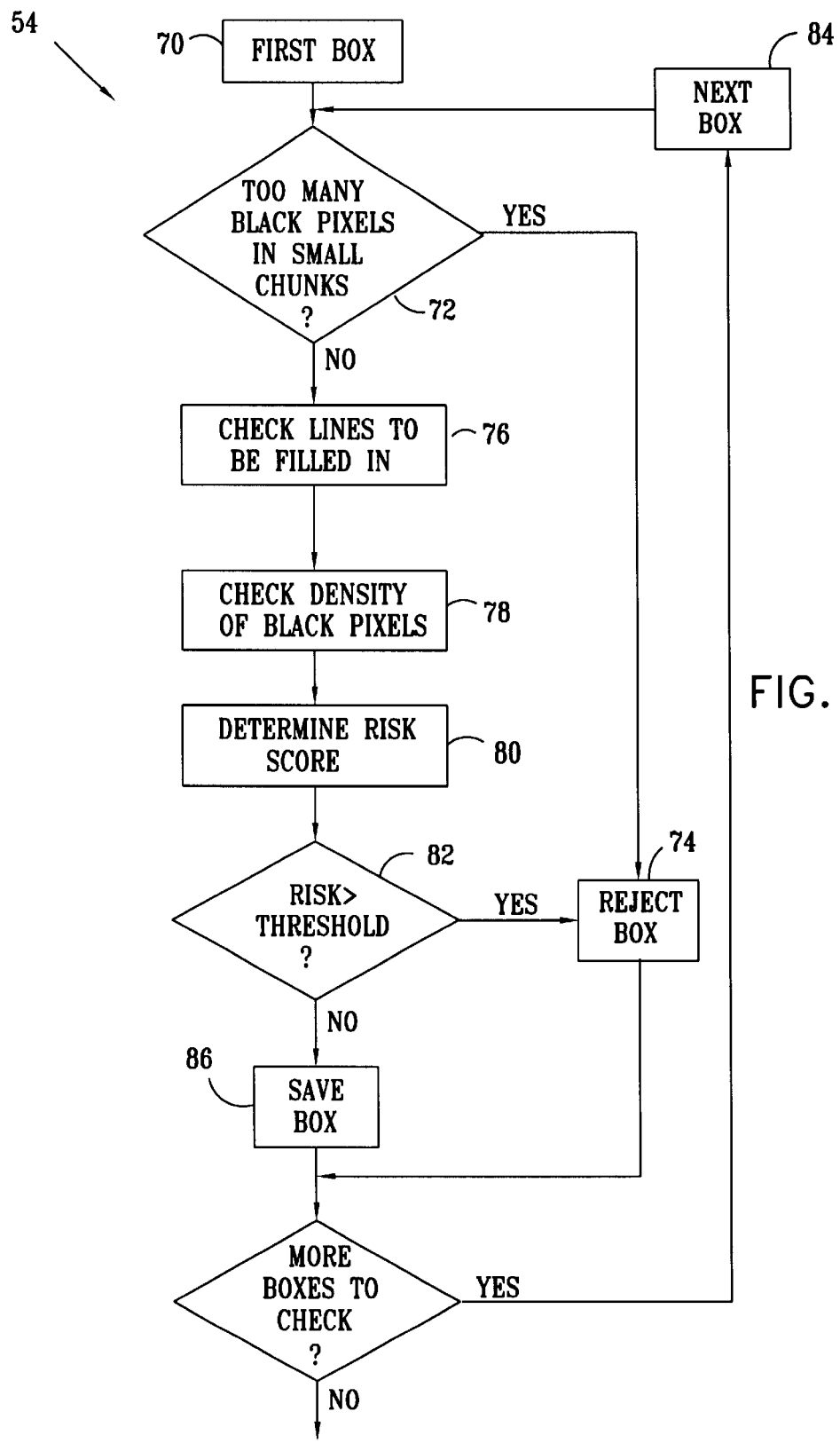
FIGS. 5A and 5B are flow charts that schematically illustrate a method for choosing reference areas in a form template, in accordance with a preferred embodiment of the present invention.
Figure 5B:
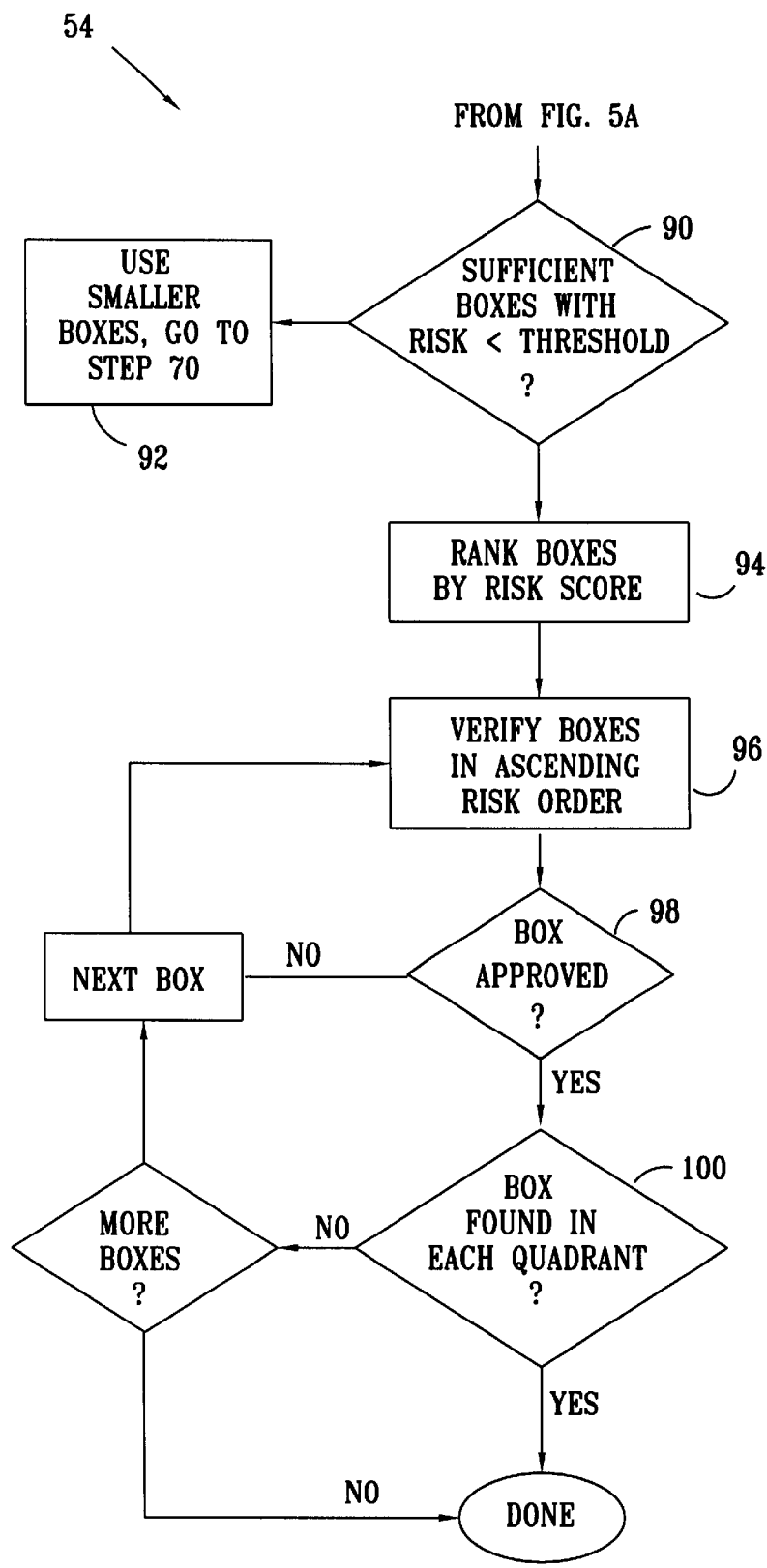

FIGS. 5A and 5B are flow charts that schematically illustrate details of reference area selection step 56, in accordance with a preferred embodiment of the present invention. As noted above, the object of this reference area selection procedure is to reduce the risk of confusion and incorrect matching results. Such risks typically result from changes in the appearance of reference areas of document 24 due to information that is filled into the form or to contrast variations in scanning the document into apparatus 20. The method illustrated in these figures selects optimal reference areas automatically, substantially without user intervention. It will be understood, however, that this process may be modified to allow greater user interaction in choosing the selection criteria and/or in choosing the actual reference areas. Alternatively, the reference areas may be chosen manually and then used in automated processing of document 24, as described hereinbelow with reference to FIGS. 6, 7 and 8.

At an initial step 70, a first box, typically 100×100 pixels, is selected. Preferably, a fixed margin is left at the edges of the template, typically a margin of about 25 pixels, and the margins are excluded from consideration as reference areas. Then, for each box, the number of black pixels that are grouped in small "chunks," typically chunks of less than 6×6 pixels, are counted, at a chunk counting step 72. If this number comprises a substantial portion of all of the black pixels in the box, typically more than ⅓ of all of the black pixels, then the box is rejected, at a box rejection step 74. The reason for the rejection is the risk that these small chunks of black pixels will fuse together when a document based on this template is scanned at high contrast or disappear if the scan contrast is low.

For those boxes that pass step 72, the number of consecutive rows having wide enough spaces to be filled in with writing is counted at a fill-in count step 76. For this purpose, a "bad row" of type A is preferably defined as a row in which there is a run of white pixels with a length of at least ⅓ of the length of the portion of the row contained in the box, and in which the total number of white pixels is more than ⅔ of the length of this portion of the row. At a black density step 78, a "bad row" of type B is defined as a row containing an excessive number of black pixels, typically more than ⅔ of the row length contained in the box. The black pixels in such rows are liable to fuse together in scanning. Based on the results of steps 76 and 78, a risk score is determined for the box, at a scoring step 80. Preferably, the risk score is equal to the maximum number of consecutive bad rows in the box that are of the same type. At a threshold testing step 82, however, the box is rejected if the cumulative number of bad rows of either type in the box exceeds a given threshold. Preferably, the box is rejected if either more than ⅔ of the rows are type A bad, or there are less than five rows that are not type B bad. If the box has an acceptable risk score, i.e., a risk score below a predetermined threshold, such as 30, it is passed to a candidate list, at a box saving step 86.

After the risk score of the first box has been determined, the process of FIG. 5A continues at a next box step 84. Boxes covering the entire template (except for the excluded margins) are evaluated, typically in a left-right/top-bottom raster, with a 50% overlap between successive boxes. At a sufficiency checking step 90, the number and locations of boxes on the candidate list are evaluated. As noted above, there should be at least one acceptable box found in each of quadrants 30, 32, 34 and 36. If not, then at a second pass step 92, the process of FIG. 5A is preferably repeated using smaller boxes, such as 50×50 pixel boxes, in those quadrants in which a larger box was not found. If no suitable boxes are found in a given quadrant or quadrants even at this step, then no box will be selected for these quadrants.

Assuming that multiple suitable boxes have been found, the boxes on the candidate list are ranked by their risk scores in ascending order, at a ranking step 94. These boxes are passed in this order to a verification function, at a verification step 96, which may be automatic, manual or both. The main purpose of this step to ensure that the box is unique in its vicinity, i.e., that there is not some other nearby area with which it could be confused, which would cause an error in locating the box on the form. As soon a box is verified as acceptable, at an acceptance step 98, the verification process terminates for the quadrant in which this box is located, and no further candidates in the quadrant are verified. Once an acceptable box has been verified in each of the quadrants, at a quadrant completion step 100, the process is finished for this template. The results are stored in memory 28, and apparatus 20 is ready to recognize the template in documents that it subsequently processes.

Figure 6:
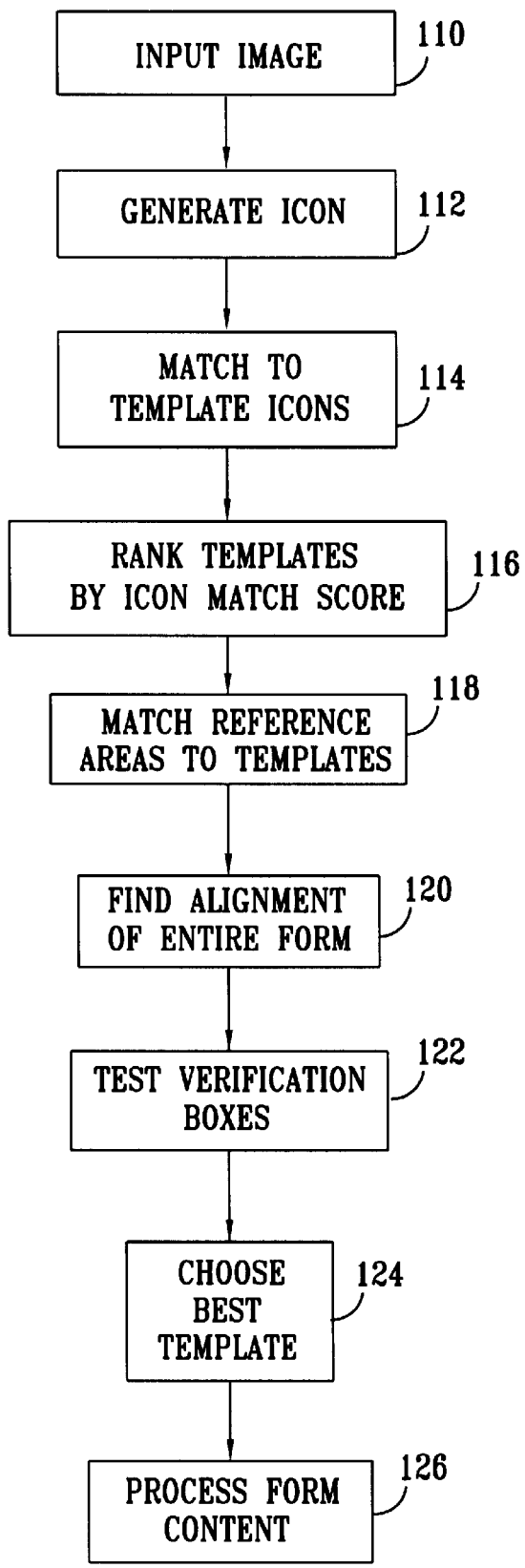
FIG. 6 is a flow chart that schematically illustrates a method for processing a form document using the apparatus of FIG. 1, in accordance with a preferred embodiment of the present invention.

FIG. 6 is a flow chart that schematically illustrates a method for processing document images, using the template information prepared and stored in the method of FIG. 3, in accordance with a preferred embodiment of the present invention. At an input step 110, document 24 is input for processing by processor 26, either through scanner 22 or via any other suitable means known in the art. At an icon generation step 112, the processor produces a reduced-scale image of the document, preferably using the method of FIG. 4. If template icons have been stored at multiple, different scales, then multiple icons of the document are preferably generated at the multiple corresponding scales.

The document icon is compared to the icons of all of the templates stored in memory 28, or at least of those templates in a common class with the document, at an icon matching step 114. Preferably, for each template icon, the pixels of the document icon are shifted in order to reach an initial alignment of the features of the icons. Most preferably, the pixel values in each row and in each column are summed to generate, respectively, row and column histograms. These histograms are thus projections of the total pixel intensities in the icon onto the vertical and horizontal axes. The row histogram of the document is shifted to find a best match with the row histogram of the icon, thereby giving a vertical shift, while the column histograms are used in like manner to find a horizontal shift. After applying the vertical and horizontal shifts to the document icon, the two-dimensional bitmaps of the document and template icons are compared to find a match score for the template, preferably using the scoring method described hereinbelow.

At a ranking step 116, the templates are ranked in descending order of the icon matching scores determined at step 114. Templates with very low match scores are rejected from further consideration. A low-score threshold for this purpose is set depending on application requirements and the type of form involved. Using the scoring method described hereinbelow, for example, the threshold for template rejection might be set at −100 or at 100 less than the best icon score that is found. The remaining templates are processed, at a reference area matching step 118, to determine how well their respective reference areas match the corresponding reference areas of document 24. The templates are processed at this step in the order of their icon-based ranking. A global matching score is determined for each template, which expresses the quality of the match between the template reference areas and the corresponding areas of the document. Details of this step are described hereinbelow with reference to FIG. 7.

As part of reference area matching step 118, transformations are applied to the reference areas found on document 24 in order to bring them into registration with the corresponding reference areas of the template. At a fine alignment step 120, the positions of the reference areas are used to determine a global transformation, to be applied to all of the pixels of the document image in order to improve the alignment of the document image with the template. This fine alignment is based on a novel, cluster-based fitting algorithm, which is described in detail with reference to FIG. 8, below.

Optionally, assuming that the templates includes additional verification boxes, the corresponding areas on the document are checked against these boxes, at a verification step 122. This step is preferably applied only for those templates that were found to have relatively high global matching scores. Verification boxes and their use are described in U.S. Pat. No. 6,665,839, which is assigned to the assignee of the present application, and whose disclosure is incorporated herein by reference. A verification score is calculated, in a similar manner to calculation of the global matching score, and a final matching score for each template is preferably given by the minimum of the global matching score and the verification score.

At a template selection step 124, the most suitable template is chosen, based on the global matching scores and/or the final matching scores. If one of the templates has a high global or final matching score (wherein again, "high" is determined by application requirements and form type), then any remaining templates that have a significantly lower icon matching score than this template are preferably removed from further consideration. At the end, any template that has high enough icon matching and global/final matching scores to have survived the previous selection steps is considered a good candidate to be identified with document 24. If more than one template is left at this stage, methods of detailed template matching, as are known in the art, are used to select the most appropriate template.

Finally, the aligned document is processed, at a content processing step 126, to identify and extract the information contained in the fields of the template. Preferably, the known identity and position of the template in the image are used in removing the template from the image before processing text and numbers contained in the template. A variety of suitable methods are known in the art for this purpose, such as those described in U.S. Pat. Nos. 5,182,656, 5,204,756 and 5,793,887, whose disclosures are incorporated herein by reference.

Figure 7:
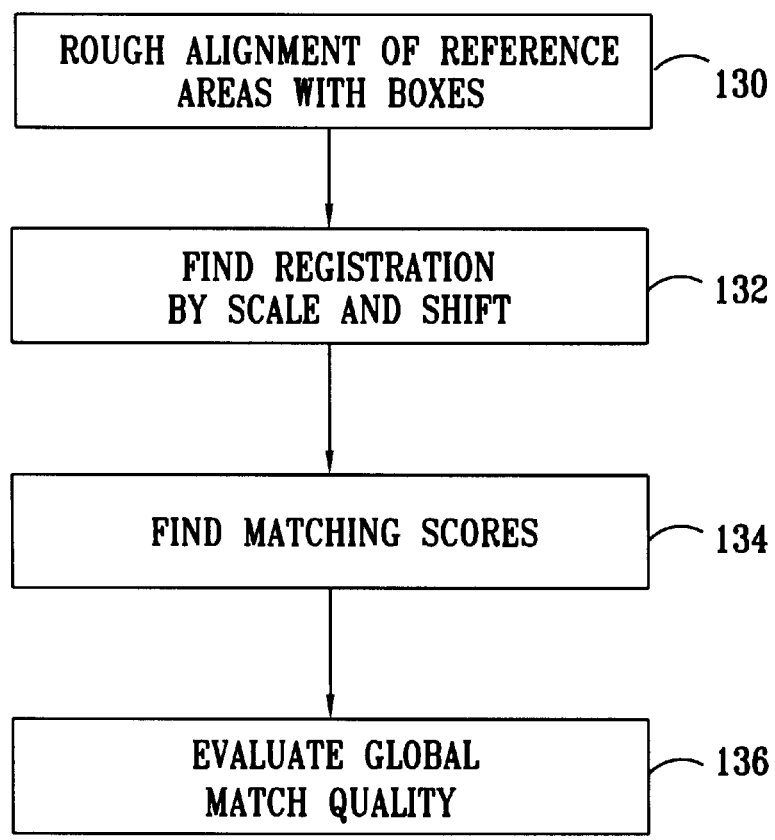
FIG. 7 is a flow chart that schematically illustrates a method for matching reference areas on a form document to corresponding reference areas of a form template, in accordance with a preferred embodiment of the present invention.

FIG. 7 is a flow chart that schematically illustrates details of reference area matching step 118, in accordance with a preferred embodiment of the present invention. At a rough alignment step 130, the transformation found at icon matching step 114 is used to find the reference areas on the document image that best match the template reference areas. The image transformation and the locations of the reference areas will generally be different for each template that is evaluated at this stage. The reference areas on the document are preferably found and registered with the template reference areas using the type of row and column histogram matching described above with reference to step 114. Once the reference areas are registered, the areas are transformed to bring them into fine registration with the template, at a fine registration step 132. The transformation applied at this step is preferably a warping transformation as described in the above-mentioned U.S. Pat. No. 5,793,887, although other methods known in the art may also be used.

When the reference areas have been registered with the template, a matching score is determined for each of the reference areas, at a match scoring step 134. The matching score for each box is preferably found using the following formulas:

$$n_1 = \|\{ref\} \& \{reg\}\| + 1$$

$$n_2 = \|\{ref\} \oplus \{reg\}\|$$

$$n_3 = \|(\{ref\} \oplus \{reg\}) \& Expand(\{ref\} \& \{reg\})\|$$

$$Score = 100 - \frac{100(n_2 - n_3)}{n_1}$$

Here {ref} is the locus of black pixels in the reference area of the template, while {reg} is the locus of the black pixels in the corresponding area in the document image. The "&" operator represents the conjunction of these loci (bitwise AND), and $\oplus$ is their disjunction (XOR). The operator represented by ||set || returns the count of pixels in the set. "Expand" refers to a morphological expand operation, so that $n_3$ provides a measure of the number of pixels whose values differ between the template and document reference areas but which border on other pixels whose values are the same in both reference areas.

The matching scores determined for all of the reference areas at step 134 are combined to determine the overall match quality between the document and the template, at a global evaluation step 136. Preferably, the global matching score is set to the minimum of the individual matching scores of the reference areas. If, however, there are two or more reference areas with particularly low scores (typically below 80%), then the global matching score for the template is preferably reduced further, since it is unlikely that this is the correct template. The global matching results are used together with the verification results from step 122 in choosing the best template for the current document at step 124 (FIG. 6).

Figure 8:
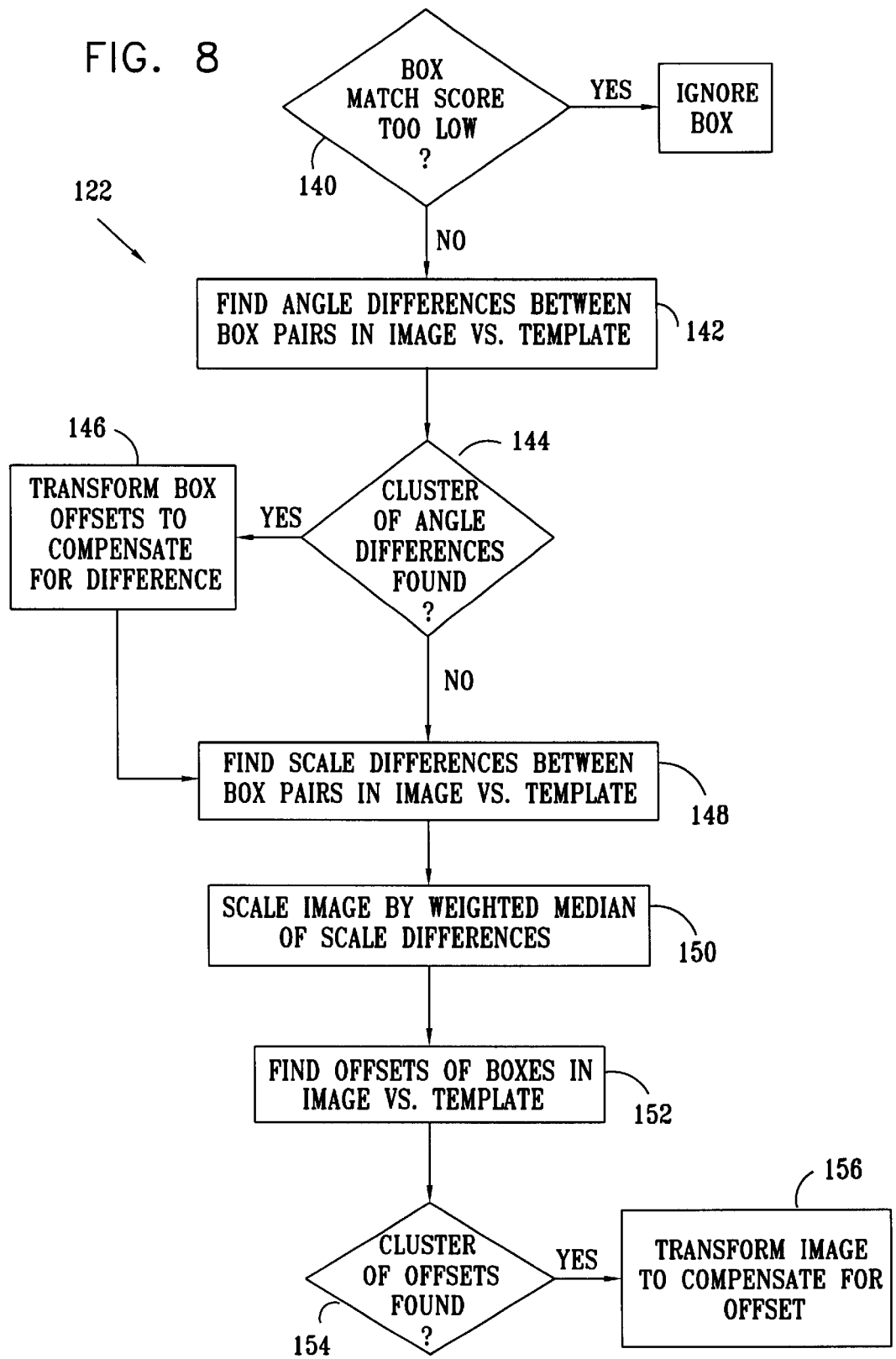
FIG. 8 is a flow chart that schematically illustrates a method for fine alignment of a form document image with a template, in accordance with a preferred embodiment of the present invention.

FIG. 8 is a flow chart that schematically illustrates details of fine alignment step 122, in accordance with a preferred embodiment of the present invention. Once all of the box matches have been performed at step 118, there is an estimated offset of each box located in document 24 with respect to the reference areas of the identified template. This information is used to compute an exact geometric transformation between the observed and reference images. In determining the transformation, reference areas whose individual matching scores, found at step 134, were below a given threshold are rejected from consideration, at a low score elimination step 140. Typically, the rejection threshold is set to 50.

First, at an angle finding step 142, an angle difference between the document and template images is calculated. For each two reference boxes that were not rejected at step 140, the slope of a line drawn between the centers of the two boxes in the template is determined, and so is the slope of a comparable line between the centers of the two corresponding boxes in the document image. These slopes are used to compute an angle difference between the two lines. This difference is recorded as an angle difference candidate along with the lower of the match scores of the two boxes.

At a cluster evaluation step 144, all of the angle difference candidates for all of the boxes are examined. If there is a cluster of at least five candidates that do not differ by more than 0.05 radian, its center of weight is found with respect to the match scores of the candidates. If there is more than one such cluster, the cluster with the best cumulative match score is taken. The calculated center-of-weight angle value is used, at a skew compensation step 146, to estimate the skew of the document image relative to the template. The offsets of the reference boxes in the document image are corrected so as to compensate for the angle difference.

Scale differences between the document image and the template are computed at a scale evaluation step 148. For each two reference boxes that were not rejected at step 140, a horizontal projection of the line between centers of the two boxes in the template and a horizontal projection of the line between the centers of the two corresponding boxes in the document image are found. If both projections are longer than a preset threshold, typically 100 pixels, then the ratio between these two lengths is computed. This ratio is recorded, together with the minimum matching score of the two boxes, as a horizontal scale candidate. Similarly, vertical scale candidates are found using vertical projections of lines taken between the centers of different pairs of boxes.

At a scaling step 150, weighted medians of the horizontal and vertical scale candidates are determined. The weighted median in this context is a number such that the sum of the matching scores of all the scale candidates less than the median is as close as possible to half of the total of the matching scores of all of the scale candidates. The weighted medians become the new horizontal and vertical scales, which are applied to the document image.

Finally, at an offset evaluation step 152, the offset between the document image and the template is computed. For every box not rejected at step 140, horizontal and vertical offsets of the box in the document image relative to the corresponding box in the template are recorded as horizontal and vertical offset candidates, together with the match score of the box. At a cluster finding step 154, a cluster of at least two offset candidates that do not differ by more than 50 pixels is sought in each of the horizontal and vertical offset candidate lists. If such clusters do exist, the cluster with the best score is found, and its center of weight is computed with respect to the matching scores. Using this calculated value, normalized by the computed scale, the offset of the document image relative to the template is adjusted, at an image offset step 156.

Although the preferred embodiments described herein are concerned with processing of form documents, the principles of the present invention may similarly be applied in other image processing contexts in which a known template must be identified within an image whose content may vary. Furthermore, although preferred embodiments are described herein with reference to processing of binary images, as are commonly used in document image processing, it will be appreciated that the methods of the present invention may be applied, mutatis mutandis, to gray-scale and color images, as well.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for processing an input image, comprising:

for each of a plurality of different templates, computing a reference metric for each of a multiplicity of candidate areas;

selecting reference areas from among the candidate areas on each of the plurality of different templates responsive to the reference metrics thereof;

comparing reference areas on the input image to the selected reference areas on at least some of the templates, so as to compute a matching score for each of the templates indicating a degree of similarity between each template and the input image;

identifying the template whose matching score indicates the greatest degree of similarity; and extracting information from the input image based on the identified template.

2. A method according to claim 1, wherein the input image comprises an image of a form document, having fields defined by one of the templates, which fields are filled in with the information, and wherein extracting the information comprises registering the input image with the identified template.

3. A method according to claim 2, wherein computing the reference metric for each of the candidate areas comprises estimating a likelihood that the candidate area will be filled in.

4. A method according to claim 3, wherein selecting the reference areas comprises rejecting areas that comprise runs of white pixels of a length exceeding a predetermined criterion.

5. A method according to claim 1, wherein computing the reference metric for each of the candidate areas comprises estimating a likelihood of a change in appearance of the area due to contrast variations in scanning an object that appears in the input image.

6. A method according to claim 5, wherein selecting the areas comprises rejecting areas that comprise predetermined concentrations of black pixels.

7. A method according to claim 1, wherein computing the reference metric comprises determining a risk score indicative of a likelihood of confusion in identifying the template based on a given reference area, and wherein selecting the reference areas comprises selecting one or more reference areas having respective risk scores within a predetermined limit.

8. A method according to claim 1, wherein selecting the reference areas comprises selecting at least one of the candidate areas in each of a number of predetermined sectors of each template.

9. Apparatus for processing an input image, comprising:

a memory, which is adapted to store images of a plurality of different templates; and an image processor, which is adapted to compute a reference metric for each of a multiplicity of candidate areas on each of the templates and to select reference areas from among the candidate areas on each of the plurality of different templates responsive to the reference metrics thereof, and further to receive the input image and compare reference areas on the input image to the selected reference areas on at least some of the templates, so as to compute a matching score for each of the templates indicating a degree of similarity between each template and the input image and to identify the template whose matching score indicates the greatest degree of similarity, and extract information from the input image based on the identified template.

10. Apparatus according to claim 9, wherein the input image comprises an image of a form document, having fields defined by one of the templates, which fields are filled in with the information, and wherein the processor is adapted to register the input image with the identified template.

11. Apparatus according to claim 10, and comprising an image input device, which is adapted to capture the image of the form document and to convey the image to the processor.

12. A computer software product for processing an input image, comprising a computer-readable medium having program instructions stored therein, which instructions, when read by a computer, cause the computer to compute a reference metric for each of a multiplicity of candidate areas reference areas on each of a plurality of different templates and to select reference areas from among the candidate areas on each of the plurality of different templates responsive to the reference metrics thereof, and further to compare reference areas on the input image to the selected reference areas on at least some of the templates, so as to compute a matching score for each of the templates indicating a degree of similarity between each template and the input image and to identify the template whose matching score indicates the greatest degree of similarity, and to extract information from the input image based on the identified template.

* * * * *